US009217997B2

(12) United States Patent
Racine

(10) Patent No.: US 9,217,997 B2
(45) Date of Patent: Dec. 22, 2015

(54) METHOD AND APPARATUS FOR CONTROLLING A SURFACE SCANNING COORDINATE MEASURING MACHINE

(75) Inventor: Paul P. Racine, Providence, RI (US)

(73) Assignee: Hexagon Technology Center GmbH, Heerbrugg (CH)

( * ) Notice: Subject to any disclaimer, the term of this patent is extended or adjusted under 35 U.S.C. 154(b) by 126 days.

(21) Appl. No.: 13/814,278

(22) PCT Filed: Sep. 13, 2011

(86) PCT No.: PCT/US2011/051295
§ 371 (c)(1),
(2), (4) Date: Mar. 6, 2013

(87) PCT Pub. No.: WO2012/037059
PCT Pub. Date: Mar. 22, 2012

(65) Prior Publication Data
US 2013/0185948 A1 Jul. 25, 2013

Related U.S. Application Data

(60) Provisional application No. 61/382,126, filed on Sep. 13, 2010.

(51) Int. Cl.
G01B 5/004 (2006.01)
G05B 19/401 (2006.01)
(Continued)

(52) U.S. Cl.
CPC .............. *G05B 19/401* (2013.01); *G01B 5/008* (2013.01); *G01B 21/04* (2013.01); *G05B 19/404* (2013.01); *G01B 5/004* (2013.01); *G01B 21/045* (2013.01); *G01B 21/047* (2013.01)

(58) Field of Classification Search
CPC ...... G01B 5/008; G01B 21/04; G01B 21/045; G01B 21/047; G01B 5/004
USPC .......................................................... 33/503
See application file for complete search history.

(56) References Cited

U.S. PATENT DOCUMENTS 4,866,643 A * 9/1989 Dutler ............................. 702/95
5,222,034 A * 6/1993 Shelton et al. ................. 702/152
(Continued)

FOREIGN PATENT DOCUMENTS

WO WO 2012/037059 3/2012 ............. G01B 5/008

OTHER PUBLICATIONS

International Searching Authority, European Patent Office International Search Report—International Application No. PCT/US2011/051295, dated Nov. 16, 2011, together with the Written Opinion of the International Searching Authority, 10 pages.

*Primary Examiner* — Laura Martin
*Assistant Examiner* — Rhyan C Lange
(74) *Attorney, Agent, or Firm* — Sunstein Kann Murphy & Timbers LLP

(57) ABSTRACT

A method improves surface scanning measure machine speed while minimizing tip touchdown impact on the surface of the object being measured. Specifically, the method controls a surface scanning measuring machine having a probe head with a distal probe tip that contacts the surface of an object to be measured. To that end, the method selects a nominal initial contact point (on the surface) having a normal vector, and then moves the distal probe tip toward the nominal initial contact point along an approach path. The approach path has a generally linear portion that generally linearly extends from the nominal initial contact point to some non-contacting point spaced from the surface. The generally linear portion forms an angle of between about 20 degrees and about 60 degrees with the normal vector.

30 Claims, 13 Drawing Sheets

(51) Int. Cl.
*G01B 5/008* (2006.01)
*G05B 19/404* (2006.01)
*G01B 21/04* (2006.01)

(56) References Cited

U.S. PATENT DOCUMENTS

| | | | |
|---|---|---|---|
| 5,471,406 A * | 11/1995 | Breyer et al. | 702/168 |
| 5,491,638 A * | 2/1996 | Georgi et al. | 700/195 |
| 5,726,917 A | 3/1998 | Staaden | 364/560 |
| 5,895,444 A * | 4/1999 | Ruck et al. | 702/168 |
| 6,810,597 B2 * | 11/2004 | Grzesiak et al. | 33/503 |
| 7,251,580 B2 | 7/2007 | Nomura et al. | 702/168 |
| 7,685,726 B2 | 3/2010 | Fuchs et al. | 33/503 |
| 7,779,553 B2 | 8/2010 | Jordil et al. | 33/558 |
| 2005/0076522 A1 * | 4/2005 | Matsuki et al. | 33/554 |
| 2008/0021672 A1 * | 1/2008 | Powley et al. | 702/158 |
| 2008/0195353 A1 * | 8/2008 | Igasaki et al. | 702/168 |
| 2010/0050837 A1 * | 3/2010 | Ould et al. | 83/14 |

* cited by examiner

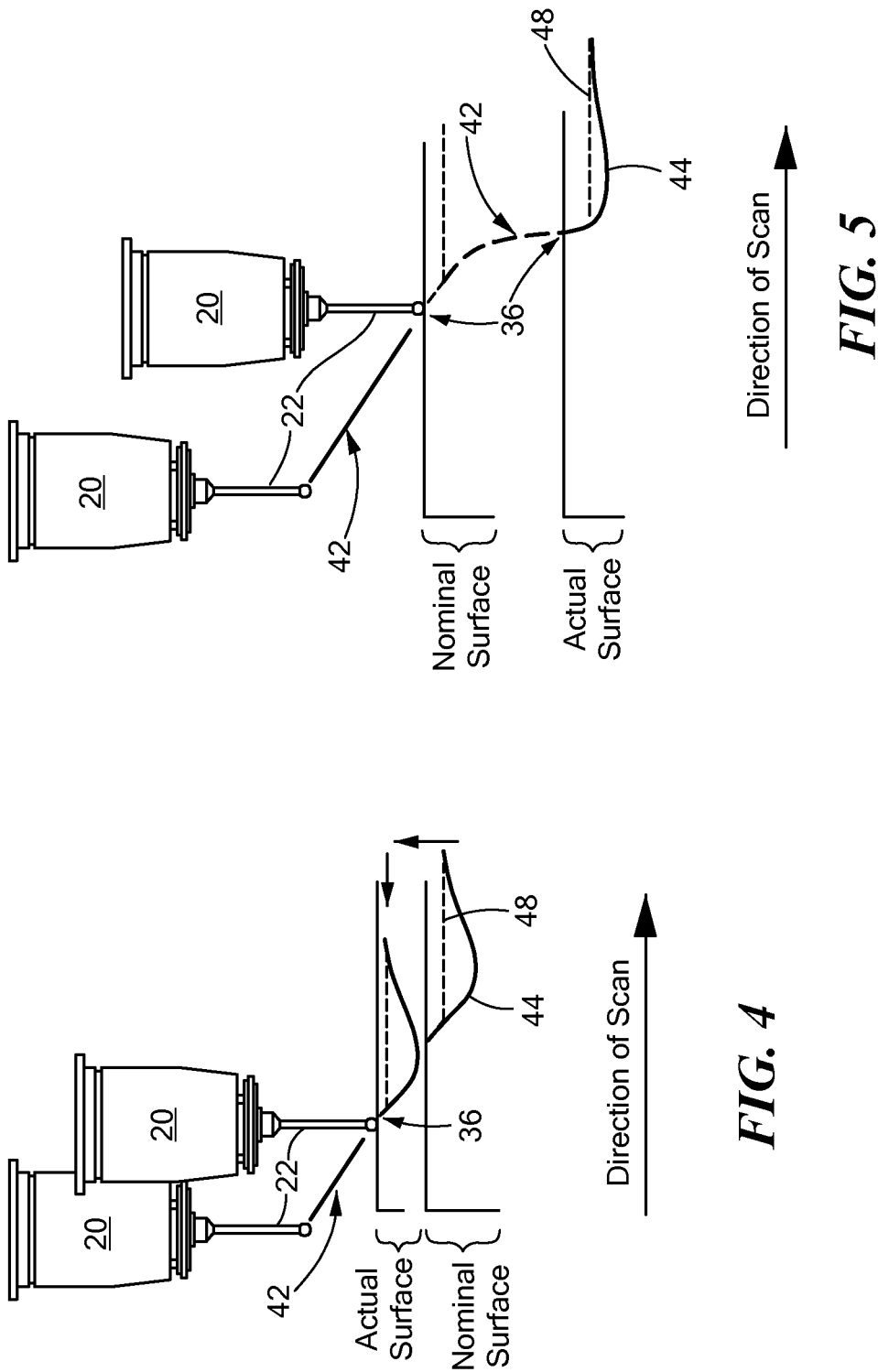

METHOD AND APPARATUS FOR CONTROLLING A SURFACE SCANNING COORDINATE MEASURING MACHINE

PRIORITY

This patent application claims priority from provisional U.S. patent application Ser. No. 61/382,126 filed Sep. 13, 2010 entitled, "METHOD FOR CONTROLLING A SURFACE SCANNING COORDINATE MEASURING MACHINE," and naming Paul Racine as inventor, the disclosure of which is incorporated herein, in its entirety, by reference.

FIELD OF THE INVENTION

The invention generally relates to controlling a surface scanning coordinate machine and, more particularly, the invention relates to controlling probe movement of a surface scanning coordinate machine.

BACKGROUND OF THE INVENTION

Among other things, coordinate measuring machines ("CMMs," also known as surface scanning measuring machines) measure unknown surface profiles, or verify the topography of known surfaces. For example, a CMM may measure the topological profile of a propeller to ensure that its surface is appropriately sized and shaped for its specified task (e.g., moving a 24 foot boat at prespecified speeds through salt water). To that end, conventional CMMs typically have a probe head supporting a probe tip (also called a "stylus") that directly contacts and moves along a surface of an object being measured.

After the tip initially contacts the surface of an object, the probe head is driven toward the object surface to dampen vibrations and to prepare it for subsequent scanning (often referred to as "settling" the probe head). After settling, the probe tip moves along a predefined scan path, recording its movement in one, two, or three dimensions. Logic associated with the CMM records this movement to produce a corresponding surface topological map of the measured object.

During a typical scan, the CMM may move the probe tip into and out of contact with the surface many times to avoid known deep recesses or other surface features. Both initial and final contact with the surface, however, create a number of performance challenges. Specifically, upon initial approach to the surface, the CMM has competing goals of approaching as quickly as possible, while at the same time avoiding a hard landing. Many conventional CMMs manage this by sacrificing speed—they slowly approach a surface along a normal vector, stopping both before and after contact with the surface. This approach thus reduces throughput, increasing costs.

Another technique brings the tip into contact with the surface along a very shallow angle with the surface, and appears to settle while moving at that shallow angle. While attempting to mitigate the hard landing issue, this technique still is time consuming because of the lengthy time it takes to approach the surface. In addition, the shallow angle makes the settling more challenging.

SUMMARY OF THE INVENTION

In accordance with one embodiment of the invention, a method improves surface scanning measure machine speed while minimizing tip touchdown impact on the surface of the object being measured. Specifically, the method controls a surface scanning measuring machine having a probe head with a distal probe tip that contacts the surface of an object to be measured. To that end, the method selects a nominal initial contact point (on the surface) having a normal vector, and then moves the distal probe tip toward the nominal initial contact point along an approach path. The approach path has a generally linear portion that generally linearly extends from the nominal initial contact point to some non-contacting point spaced from the surface. The generally linear portion forms an angle of between about 20 degrees and about 60 degrees with the normal vector.

The method also may move the distal probe tip from a contact point (related to the nominal initial contact path) along an offset path and to an initial scan point, and then move the distal tip along a scan path from the initial scan point and along the surface of the object. The distal probe tip preferably moves continually along and between the approach path, the offset path, and the scan path. The generally linear portion also may form an angle with the normal vector of between about 20 and about 55 degrees.

Some embodiments move the distal probe tip along a release path, beginning after the scan path, where the tip moves away from contact with the surface of the object. The distal probe tip in this embodiment may move continually along and between the scan path and the release path. In addition, the method may select a second nominal initial contact point (having a second normal vector) on the surface. After moving the distal probe tip from the release path, the method may move the distal probe tip into contact with a second contact point (related to the second nominal initial contact point) along a second approach path. The second approach path has a second generally linear portion that generally linearly extends from the second contact point to some second non-contacting point spaced from the surface. This second generally linear portion forms an angle of between about 20 degrees about 59 degrees with the second normal vector. The distal probe tip may move continually along and between the release path and the second approach path.

The method may move the probe head downwardly and settle at an offset after moving the distal probe tip into contact with a contact point. During this time, the probe head may overshoot the offset before settling at the offset. Alternatively, the probe head may oscillate above and below the offset before settling at the offset.

In accordance with another embodiment, a surface scanning measuring machine for contacting the surface of an object to be measured has a probe head with a distal probe tip, and a controller operatively coupled with the probe head. The controller is configured to select a nominal initial contact point having a normal vector on the surface (i.e., on the surface itself or on the nominal surface). The machine also has a drive mechanism operatively coupled with the controller. The drive mechanism is configured to cooperate with the controller to move the distal probe tip toward the nominal initial contact point along an approach path. The approach path has a generally linear portion that generally linearly extends from the nominal initial contact point to some noncontacting point spaced from the surface. The generally linear portion forms an angle of between about 20 degrees and about 60 degrees with the normal vector.

In accordance with other embodiments of the invention, a method of controlling a surface scanning measuring machine having a probe head with a distal probe tip configured for contacting the surface of an object to be measured selects a nominal initial contact point, having a nominal vector, on the surface. The method moves the distal probe tip toward the nominal initial contact point along an approach path having a generally linear portion that generally linearly extends from the nominal initial contact point to some non-contacting point spaced from the surface. The generally linear portion forms an angle with the normal vector of less than about 60 degrees. The method then moves the distal probe tip along an offset path to an initial scan point. The distal probe tip preferably moves continually along and between the approach path and the offset path.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 schematically shows a portion of the path shown in FIG. 3 in which the scanning surface is higher than the nominal surface.

FIG. 5 schematically shows a portion of the path shown in FIG. 3 in which the scanning surface is lower than the nominal surface.

DESCRIPTION OF ILLUSTRATIVE EMBODIMENTS

In illustrative embodiments, a coordinate measuring machine directs the approach of its probe head and tip toward the surface to be measured at an angle of less than about 60 degrees from the nominal surface normal. Accordingly, the entire approach, settling, scanning, and release process can be completed substantially continuously, quickly, and with a minimum risk of a damaging hard impact on the measured surface. Details of illustrative embodiments are discussed below.

Figure 1A:
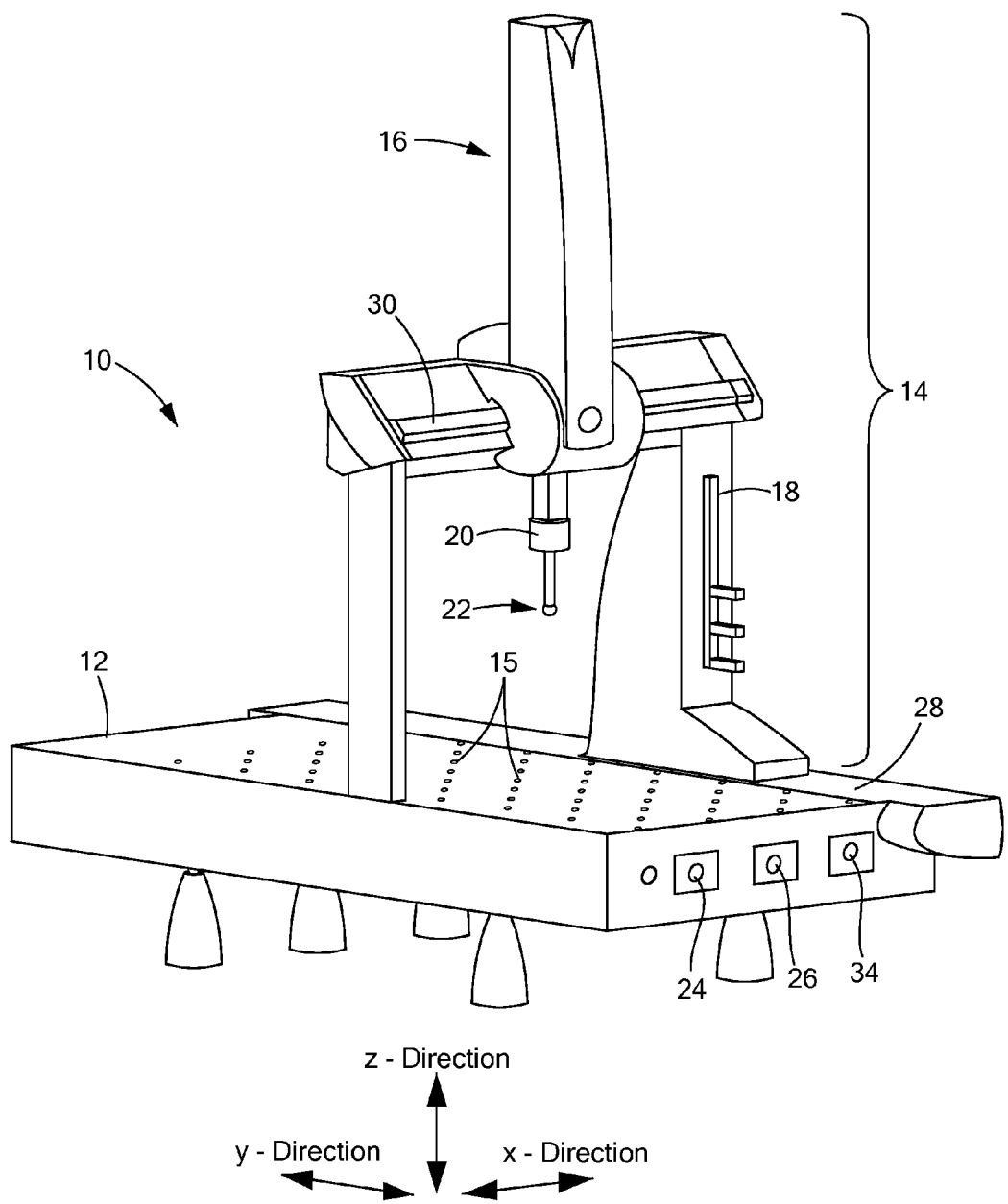
FIG. 1A schematically shows a coordinate measuring machine configured in accordance with illustrative embodiments of the invention.

FIG. 1A schematically shows a coordinate measuring machine (hereinafter "CMM 10") having logic for implementing illustrative embodiments of the invention. As with other CMMs, the CMM 10 of FIG. 1 has a generally rectangular platform 12 for supporting an object (not shown in FIG. 1) to be scanned, and a scanning apparatus 14 movably connected to the platform 12 for gathering topographical information about the supported object. The platform 12, which can be formed from any of a variety of materials, such as cement or granite, has an array of holes 15 for fixedly securing the object to its top surface.

To gather surface information about the object, the scanning apparatus 14 has a movable scanning arm 16, supported by a drive member 18, with a probe head 20 that itself supports a distal probe tip 22 (also referred to as a "probe stylus," "probe pin," or simply "tip 22"). During use, the tip 22 actually contacts the surface of the object, causing the probe head 20 to flex along the surface contours for the desired scan run. This flexing produces a set of data that on-board or external logic (e.g., host software 24) converts into a one, two, or three dimensional map of the object surface.

The entire scanning apparatus 14 thus preferably is movable in three dimensions—the X-direction (parallel to the width of the platform 12), the Y-direction (parallel to the length of the platform 12), and the Z-direction (toward and away from the top surface of the platform 12). To that end, the CMM 10 has a drive mechanism 26 that moves the drive member 18 (and thus the entire scanning apparatus 14) in the Y-direction along, for example, a drive track 28. Among other things, the drive mechanism 26 may include servo controllers and other precision movement equipment.

The scanning arm 16 provides the other two degrees of freedom; namely the moment in the X-direction and in the Z-direction. Specifically, the drive mechanism 26 moves the arm 16 along a track 30 in the X-direction, and the probe head 20 and its tip 22 toward/away from the object surface in a telescoping manner along the Z-direction.

Figure 1B:
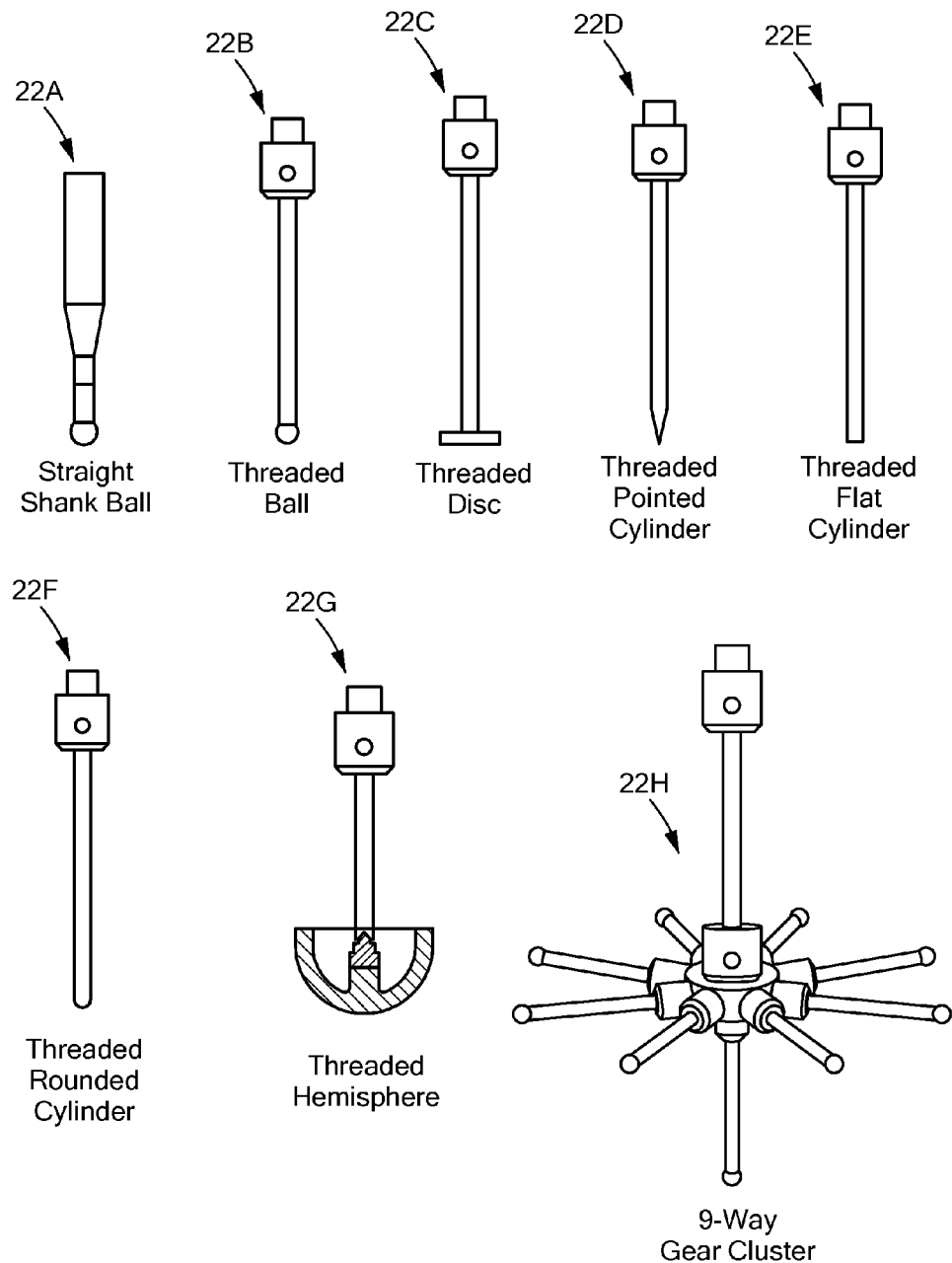
FIG. 1B schematically shows a plurality of different probe tips that may be used with the coordinate measuring machine of FIG. 1A.

The CMM 10 may employ any of a variety of different types of tips 22, depending upon the object being measured and the application. FIG. 1B schematically shows a plurality of different types of tips 22 that may be secured to the probe head 20. Those tips 22 are labeled in the drawing and include, among other things:

a straight shank ball tip 22A,
a threaded ball tip 22B,
a threaded disk tip 22C,
a threaded pointed cylinder tip 22D,
a threaded flat cylinder tip 22E,
a threaded rounded cylinder tip 22F,
a threaded hemisphere tip 22G, and
a nine way gear cluster tip 22H.

It should be noted that discussion of specific components of the CMM 10 is for illustrative purposes only. For example, the arm 16 may move in the Z-direction using a cantilever or other non-telescoping technique, or the platform 12 may be formed in another shape (e.g., a circular shape). Moreover, the probe head 20 could use tips 22 other than the tips 22A-22H shown in FIG. 1B. Accordingly, various embodiments are not necessarily limited to the specifics of the CMM 10 of FIG. 1A.

In accordance with illustrative embodiments of the invention, the CMM 10 has a controller 34 that efficiently directs motion of the probe head 20 and tip 22 to increase overall scan speed, while at the same time minimizing risk of a hard tip/probe head impact. To that end, illustrative embodiments of the controller 34 are configured to move the tip 22 continuously along its entire path, from its approach, settling, and scan, and through its release. As discussed in greater detail below (e.g., when discussing FIG. 2), the controller 34 selects a nominal initial contact point on the object surface as a first point of contact.

Figure 3:
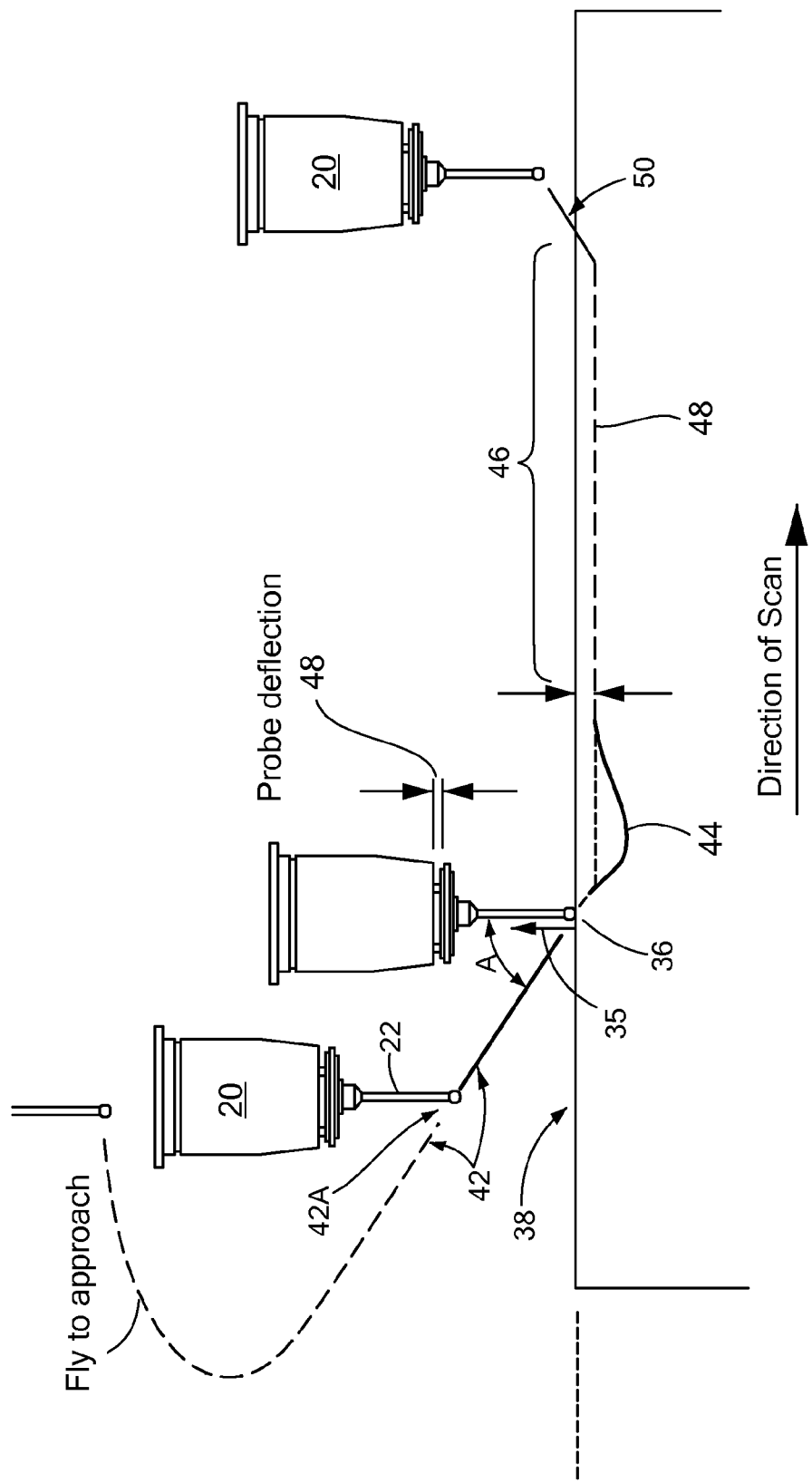
FIG. 3 schematically shows the path and various positions of a probe head and tip scanning along the surface of an object in accordance with illustrative embodiments of the invention.

As with any point on the object surface, nominal initial contact point has a normal vector (shown in FIG. 3, which is discussed below). In illustrative embodiments, the controller 34 moves the tip 22 toward the nominal initial contact point at an angle (identified in FIG. 3 by the character "A") of less than about 60 degrees from the noted normal vector. For example, this angle A may have a range of between about 5 and 60 degrees, such as about 59, 50, 40, 30, 20, or 10 degrees, among others. Other similar overlapping ranges suffice, such as between about 20 and 60 degrees, or, in some cases zero degrees.

Figure 2:
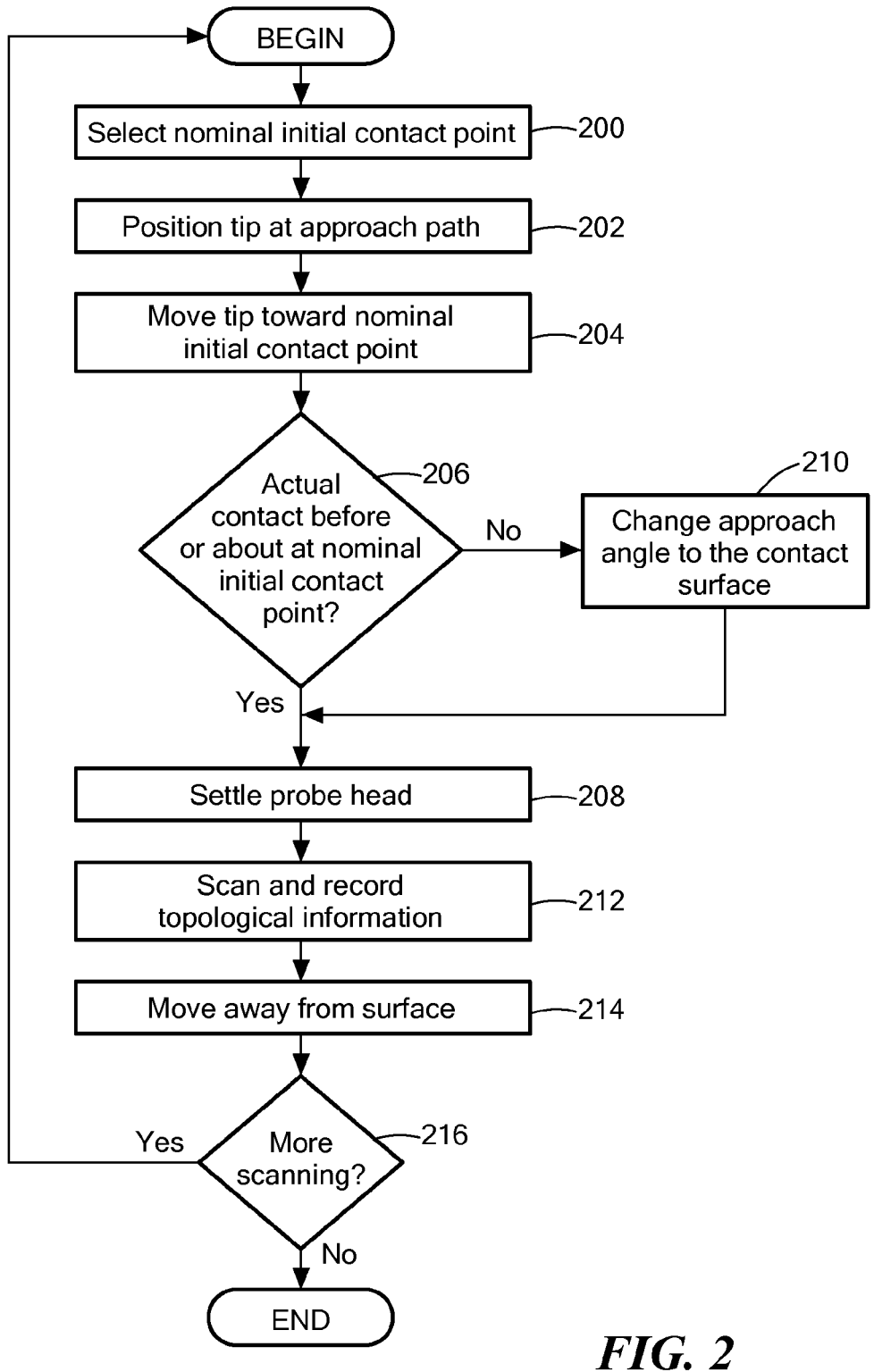
FIG. 2 shows a process of measuring the surface of an object in accordance with illustrative embodiments of the invention.

FIG. 2 shows a process of measuring the surface of an object in accordance with illustrative embodiments of the invention. Specifically, this process details the steps and position of the tip 22 in accordance with illustrative embodiments. In a corresponding manner, FIG. 3 schematically shows the progression of the tip 22 from its approach to the object surface 38, and through its release from the object surface 38. The process begins at 200, in which the controller 34 selects an initial point on the object surface 38 for the tip 22 to contact first. This point, which may be pre-programmed by an automated process or operator, may be referred to herein as the "initial contact point 36." The controller 34 receives information about the object surface 38 and initial contact point 36 to ascertain where to direct the tip 22. Among other ways, this information may be received from a user through some user interface (not shown).

At this point in the process, however, the controller 34 has only data identifying the object surface 38 and, consequently, only data identifying the initial contact point 36. In fact, the information relating to the initial contact point 36 may or may not be enough to position the tip 22 at the exact, actual initial contact point (also referred to using reference number "36"). Accordingly, the initial contact point 36 at this stage of the process is referred to as a "nominal" initial contact point 36. The initial object surface 38 also is referred to as the "nominal" object surface 38 since it too may not be actually positioned in the exact location suggested by the information.

The nominal object surface 38 and the nominal initial contact point 36 respectively may be 1) the actual object surface 38 and actual initial contact point 36, or 2) spaced from the actual object surface 38 and actual initial contact point 36. In either case, the actual initial contact point 36 is related to the nominal initial contact point 36 as the intended first point of contact on the object surface 38. Accordingly, if the CMM 10 directs the tip 22 toward the nominal initial contact point 36, it may be considered, in many instances, to be directing the tip 22 toward the actual initial contact point 36 (thus use of the same reference number 36).

The process then continues to step 202, in which the drive mechanism 26 moves the tip 22 from somewhere above the object surface 38 to a start point 42A in an approach path 42 to the object surface 38. More specifically, as shown in FIG. 3, the approach path 42 is considered to extend from the nominal initial contact point 36 to the above-noted initial point. At least a portion of this path 42 is generally linear. In preferred embodiments, this generally linear portion, which may include part or all of the approach path 42, extends directly from the nominal initial contact point 36. In illustrative embodiments, this generally linear portion forms the above noted angle A (the variety of angles discussed above that are less than 60 degrees) with the above noted normal vector 35. It should be noted that for clarity, FIG. 3 shows the normal vector 35 as being next to the initial contact point 36. This should not confuse its true location, which is at the initial contact point 36.

The process continues to step 204, in which the controller 34 directs the drive mechanism 26 to move the tip 22 toward the nominal initial contact point 36 along the generally linear portion of the approach path 42. Next, at step 206, the process determines if the tip 22 makes contact either at higher point than that of the nominal initial contact point 36, or about at the nominal initial contact point 36. Specifically, the probe head 20 will detect actual surface contact as it moves toward the object surface 38. Sometimes, this is sooner than expected since the data received about the object surface 38 may not represent the current state of the object. For example, the object may be rotated in an unexpected manner, or taller than expected. FIG. 4 schematically shows an example of the tip 22 contacting the object surface 38 at a higher point. Accordingly, in this figure, reference number 36 points to two points—the nominal initial contact point and the actual initial contact point.

In either case, if this condition of step 206 is met, then the process continues to step 208, in which the process settles the probe after contacting the surface 38. The tip 22 thus follows what is referred to herein as a "settling path 44" to complete the settling process and begin the scanning process at the beginning of a scan path 46 (discussed below).

To that end, the process moves the tip 22 in the scan direction while further pressing down, toward the object surface 38, in the Z-direction on the probe head 20. The tip 22 does not move deeper into the surface 38. Instead, as known by those skilled in the act, a flexible portion of the probe head 20 flexes a prescribed amount to settle the system for measurement. The probe head 20 flexes to ultimately settle at an "offset point 48," shown as a dashed line in FIG. 3 and identified by reference number 48. FIG. 3 also shows this amount of offset between two arrows and also identified by reference number 48. For illustration purposes, FIG. 3 (as well as other figures) shows a curve, identified by reference number 44, that begins at the actual initial contact point 36, overshoots the offset value, and returns to the offset value. This curve 44 and others like it are not intended to suggest that the tip 22 penetrates the object surface 38. Instead, this curve 44 merely shows the distance that the flexible portion of the probe head 20 flexes as the tip 22 moves along the settling path 44 in the scan direction.

The overshoot helps to reduce undesired vibrations (e.g., bouncing on the object surface 38), thus providing more precise readings. A number of different factors can contribute to such vibrations. For example, those factors may include, among other things, the defined scan speed, the spring constant of the probe head interior, the defined probe head offset, the surface finish of the object. Knowledge of these and other factors enables the CMM 10 to determine the appropriate amount of overshoot in a conventional manner.

Returning to step 206, if the tip 22 contacts the actual contact point 36 after it would contact the nominal initial contact point 36, then the process continues to step 210, which changes the approach angle A to the object surface 38. More specifically, if the tip 22 continues to move at the prescribed angle A and does not contact the object surface 38 soon enough, then 1) there may not be enough time to settle the probe head 20, or 2) the scan path 46 undesirably may begin too late to obtain accurate information. To minimize the likelihood of these problems, the tip 22 preferably moves at a much smaller angle relative to the normal vector 35 for the object surface 38. In other words, the tip 22 moves in a more direct manner toward the object surface 38. For example, as shown by FIG. 5, the tip 22 may move in a logarithmic rate or linear but small angle toward the object surface 38. In this figure (like FIG. 4), reference number 36 thus points to two points—the nominal initial contact point and the actual initial contact point. After surface contact, the process settles the probe head 20 as described above for step 208.

Now that the process has settled the probe head 20 and the tip 22 is at the beginning of the scan path 46, the CMM 10 now can begin acquiring data about the object surface 38. Accordingly, the process continues to step 212, which scans and records topologically information about the object surface 38 in a conventional manner.

At the end of the scan path 46, the tip 22 moves away from the surface 38 along a release path 50 (step 214). In some embodiments, the release path 50 is substantially similar to the approach path 42. Specifically, in such embodiments, the release path 50 has a substantially linear portion extending from the last point of surface contact. This substantially linear portion forms an angle with a normal vector, extending from the last point of surface contact, corresponding to the angle A discussed above with respect to the substantially linear portion of the approach path 42. Accordingly, this release angle can be less than about 60 degrees, such as the angles discussed above.

The process concludes at step 216 when the process no longer scans the object. There may be instances, however, when scanning continues. For example, as the tip 22 approaches the release path 50, it also may be approaching a discontinuity of some sort (e.g., a recess or hole) that it should avoid. To continue measuring the object, the process effectively jumps the tip 22 over the discontinuity—continuing the measuring process on the other side of the discontinuity. In that case, the tip 22 follows the release path 50 and loops back to step 200 to select a next nominal initial contact point 36 and repeat this process.

Illustrative embodiments move the tip 22 from the beginning of the approach path 42, through the settling path 44, scan path 46, and the release path 50 without stopping—i.e., continuously. Consequently, this improves scanning speeds, thus improving throughput. Moreover, this entire path is a pre-defined path. Alternative embodiments may stop at certain points between the paths. For example, some alternative embodiments may stop or significantly reduce tip speed between the approach path 42 and the settling path 44 to reduce the size of the settling path 44.

Figure 6:
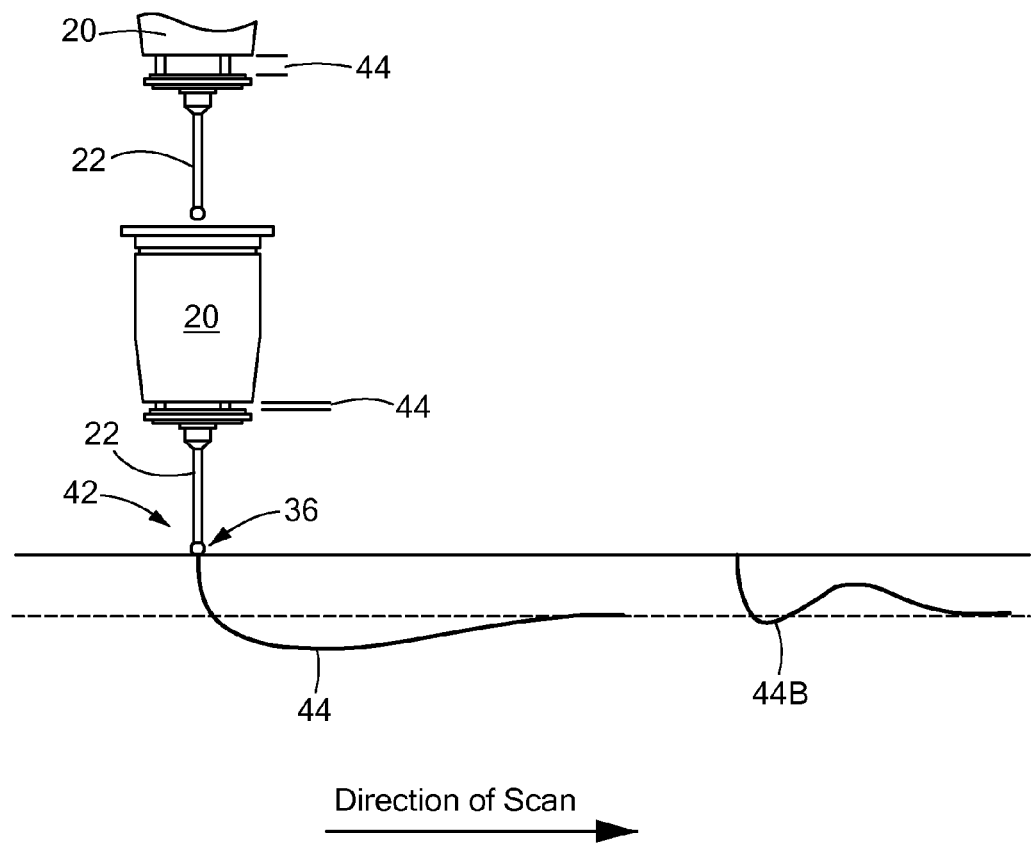
FIG. 6 schematically shows the path of a probe head and tip in accordance with alternative embodiments of the invention.

FIG. 6 schematically shows an alternate approach path 42. Specifically, in this case, the approach path 42 is substantially parallel with the normal vector 35 of the nominal initial contact point 36. In this and related embodiments, this approach path 42 may form an angle of between about 0-4 degrees with the normal vector 35. Similar to other embodiments, this embodiment continuously moves the tip 22 from the beginning of the approach path 42, through the settling path 44, scan path 46, and the release path 50 without stopping, or stops at fewer points than prior art designs.

FIG. 6 also shows an alternative settling technique for use with relatively soft object surfaces. In particular, the Z-direction force that the probe head 20 directs toward the object during the settling process causes the tip 22 to direct a corresponding force into the object surface 38. If the object is hard enough, it should have no more than a negligible impact on the measurement or the object. If the object is relatively soft, however, then this force may urge the tip 22 into the object surface 38, compromising both the integrity of the object and the accuracy of the readings. Accordingly, FIG. 6 shows another settling curve 44B in which the probe head 20 oscillates about the offset point 48. In this example, the probe head 20 only presses slightly farther down than the offset point 48, and then well above the offset point 48 before it settles at the offset point 48.

Figure 7:
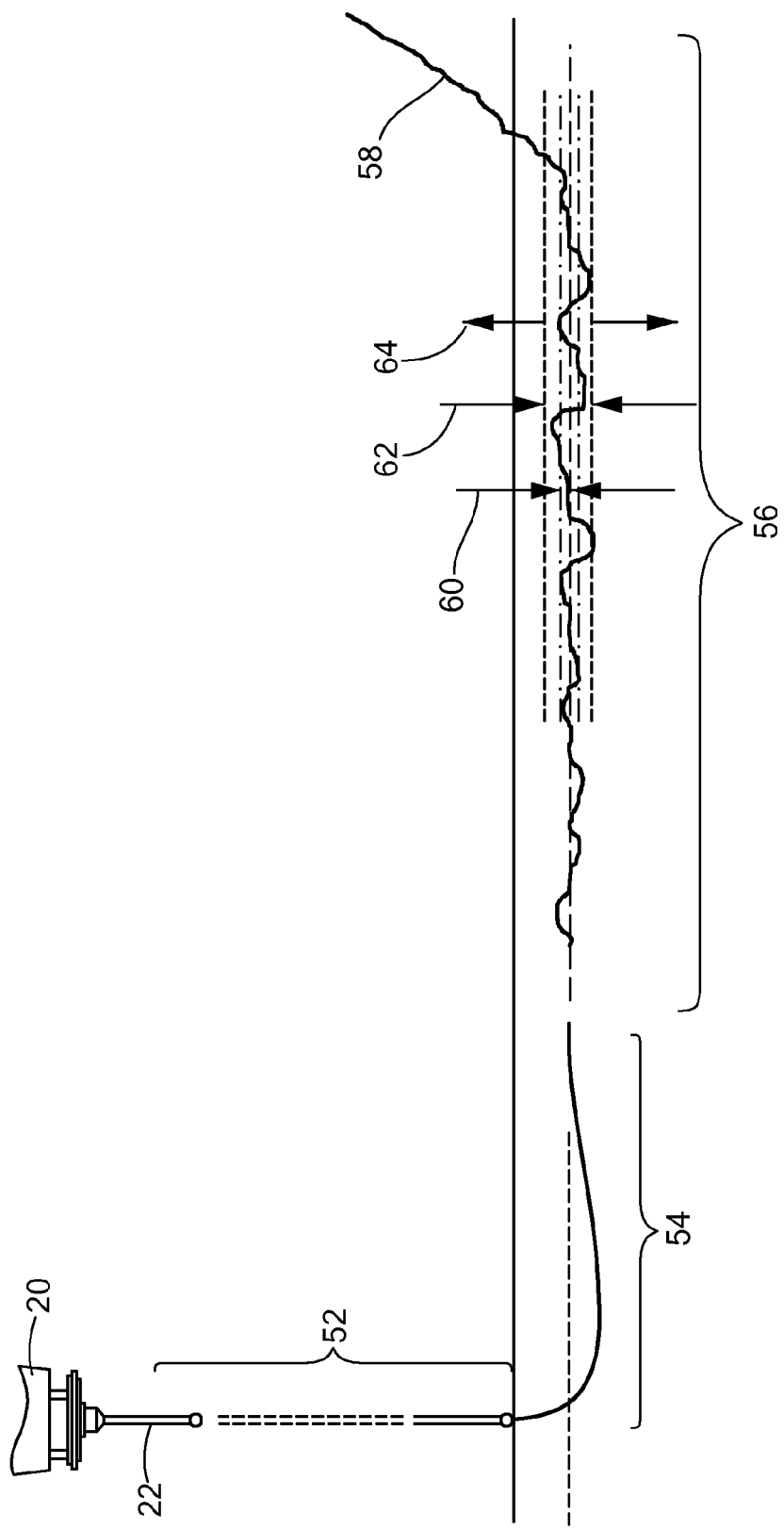
FIG. 7 schematically shows an example of a probe head and tip path illustrating positional data recording and tagging.

Data integrity is paramount. FIG. 7 thus schematically shows an example of a probe head 20 and tip path illustrating positional data recording and tagging. When the scan data is returned from the CMM 10 to the analysis software (e.g., host software 24), certain tags can be set to allow the host software 24 to:

a) sectionalize the points into parts to perform analysis on the intended defined scan path(s) 46 without regard for the approach and settling paths 42 and 44, and b) allow for deviational analysis of each point as to its qualitative properties.

Both the point and quality tags may be defined as shown in FIG. 7. With each scan segment, a unique point tag number is assigned and sent to the controller 34 from the host software 24. For example, starting from the initial contact point 36, the first scan approach segment is assigned a tag of "1" as indicated with reference number 52, the settling segment is assigned a tag of "2" as indicated with reference number 54, the defined path scan segment is assigned a tag of 3 as indicated with reference number 56, and so on, until all segments are assigned a tag. From these returned tags, the host software 24 can differentiate the scan segments and analyze only the segments of interest.

After the desired scan segments have been parsed into individual segments, a quality tag can be used to further analyze each point. Using defined parameters, each point from the actual scan data set 58 may be given a quality tag dependent on the level of adherence to the defined scan probe offset. In this way, extraneous point(s) can be ignored when the scan segment is analyzed. For instance, if a scanned point falls within the 'good' tolerance zone 60, it may be given a quality tag of zero; points within the next tolerance zone 62 but beyond the first may be given a quality tag of five, points beyond the last tolerance zone 64 may be given a quality tag of nine. This assignment of quality tags can be defined indefinitely.

Various embodiments of the present invention may be embodied in many different forms, including, but in no way limited to, computer program logic for use with a processor (e.g., a microprocessor, micro controller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Additional embodiments of the present invention are listed hereinafter, without limitation. Some embodiments provided for below are described as computer-implemented method claims. However, one of ordinary skill in the art would realize that the method steps may be embodied as computer code and the computer code could be placed on a nontransitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

ADDITIONAL EMBODIMENT

Figure 8:
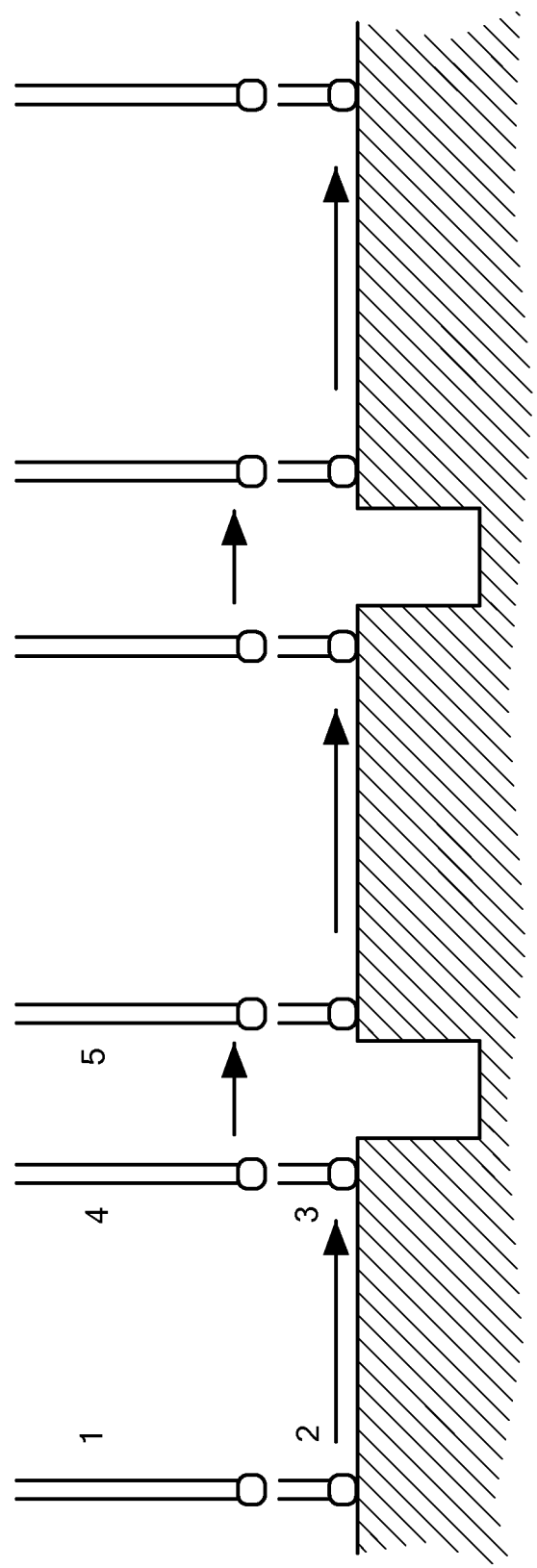
FIG. 8 shows a methodology for scanning a surface according to prior art.

FIG. 8 illustrates a prior art methodology where the tip of the probe head is moved from a starting position 1 perpendicularly to the surface. After establishing physical contact to the surface at the point of contact 2 the tip is moved to the predefined offset and subsequently the scanning starts. At the stop point 3 the tip is removed vertically to a lift-off position 4, moved to another starting point 5 and the process is started again. Therefore, this methodology can be divided in different sequential steps 1. CMM moves to pre-hit point and dwells until the 'In Position Zone' zone and probe oscillation criteria are met.
2. CMM moves the probe down to the part along the surface normal and dwells until the commanded scan probe offset is met within acceptable vibration limits.
3. CMM scans along the commanded scan path utilizing Observer to maintain commanded scan probe offset. The dwell at the end of the scan typically comes from the controller's ability to transfer the requested point density at scan velocity, data acquisition and data transfer rates.
4. CMM retracts to the retract point.
5. CMM moves to the pre-hit point of the next scan sequence and the process is repeated.

Figure 9:
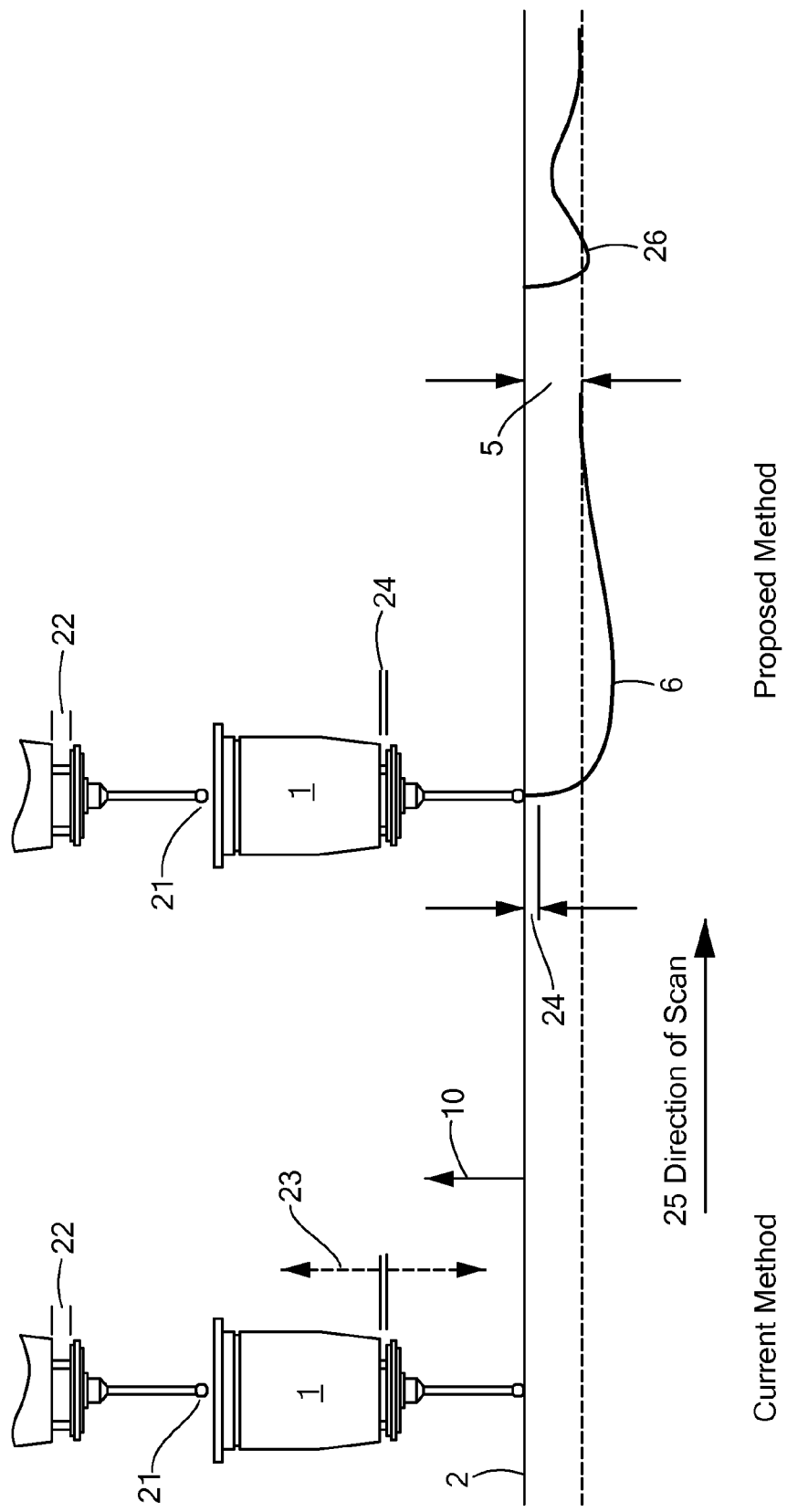
FIG. 9 shows comparison of prior art solution with the current invention.

FIG. 9 shows comparison of prior art solution with the current invention in order to illustrate elimination of CMM settling dwell when scanning. As mentioned above, the intention of this method is to eliminate all dwell time (hesitation) and to have continuous motion into and out of scan paths, with the main focus being the dwell while settling the probe and CMM from initial part surface contact to the defined scan probe offset.

Prior art methods start off at the pre-hit point 21 and wait to settle the probe 1. The CMM control servo then drives the probe 1 toward the part surface 2 along the part surface vector 10 at a defined scan velocity and continues until the defined scan probe offset 5 is reached. The system then hunts away from and toward the part surface until the probe and CMM have settled to a pre-determined amount. The defined scan path is then measured.

One of the intentions of the methods according to the invention is to monitor the probe X, Y and Z output while scanning toward the part surface (approach path) and when the probe's output reaches a pre-determined value 24, the servo control starts CMM motion toward the scan direction 25. During this motion in the scan direction 25, the probe is driven farther into the part surface 2 than the defined path offset 5 and gradually reduces the probe's offset to the defined scan offset 5. This settling path 6 is used to settle the probe and CMM from vibration of motion and 'bouncing' on the part surface.

The amount of vibration is influenced from many factors including, but not limited to, the defined scan speed, the defined scan probe offset, the part surface finish, etc. Given that the controller servo control has knowledge of these (and other) factors that determine the amount of vibration, a specified settling path can be derived for a multitude of conditions. The settling path, in some instances, may require the probe be driven away from the part surface and, without leaving surface contact, reverse the path previously stated 26.

Figure 10C:
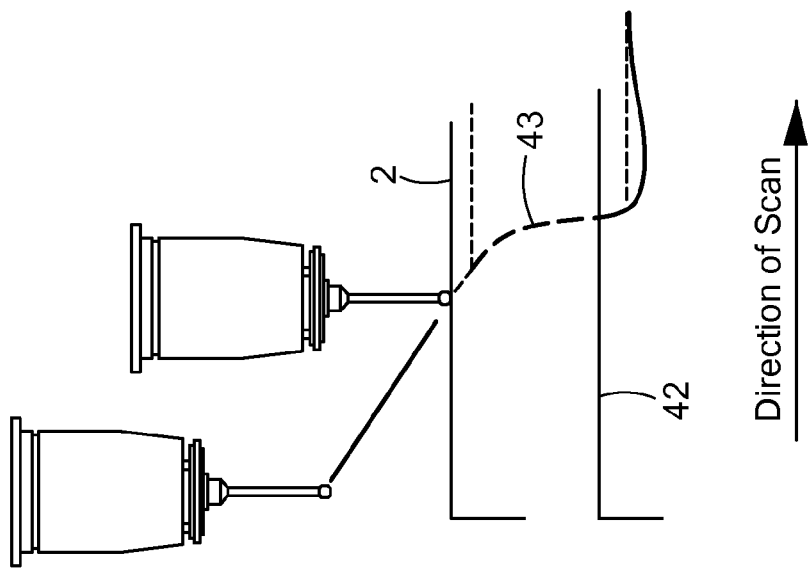
FIGS. 10A-C show approach paths for contact points with the surface at different locations.
Figure 10B:
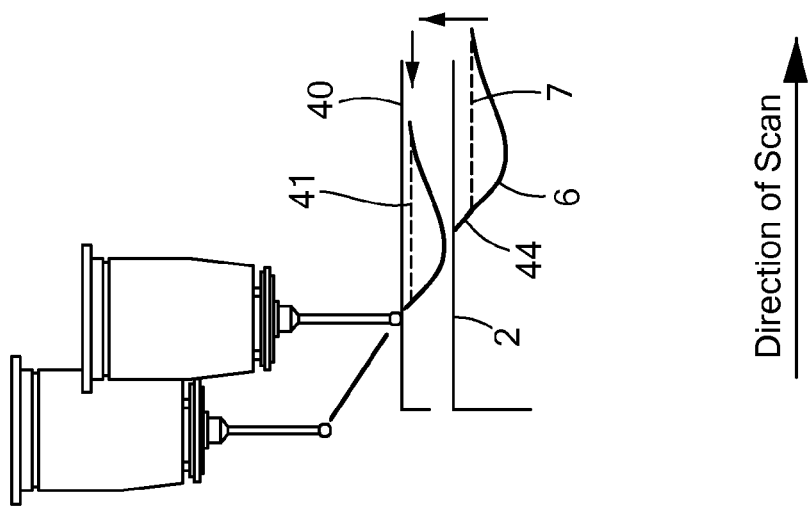
Figure 10A:
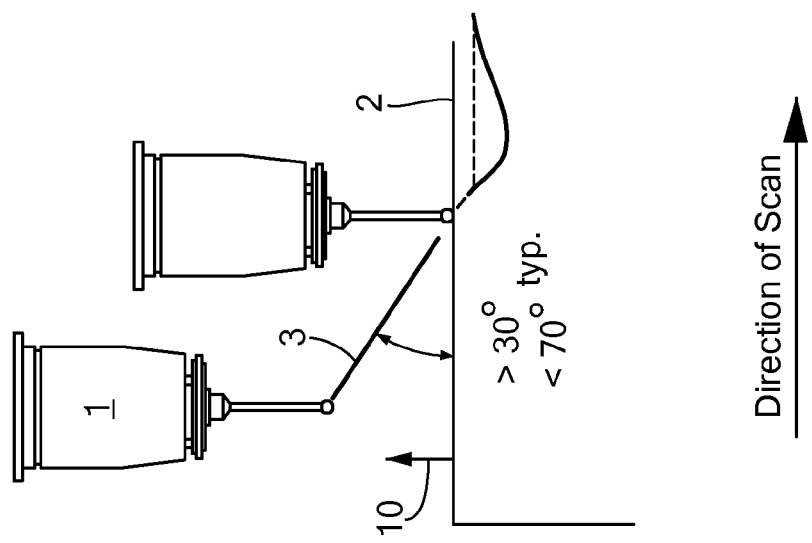

The details of approach paths are illustrated in FIGS. 10A-C for examples of contact points at different locations.

The vibrations mentioned in the description of FIG. 9 can be reduced by utilizing an approach scan 3 at an angle other than the surface vector 10 while moving toward the part surface 2, or in other words with a movement that shows significant components in both directions. Therefore, the approach angle must be greater than 30° and can be from more than 30° to close to the surface normal 10, or close to 80°. These angular ranges correspond in principal to a relation of normal velocity component to tangential velocity component in the range of 2:1 to the inverted relation, preferably a relation in the range of 1.7 to 1 to the inverted relation of 1 to 1.7.

A problem can arise if the actual part surface is not in position as described by the nominal surface 2. The two cases are:

The actual surface location 40 is out of position along the nominal surface vector 10 which is illustrated in FIG. 10B. In this case, the entire settling scan path 6 and the defined scan path 7 are relocated from their nominal paths 44 to a point whereby the CMM is servo controlled in the same manner as described in the description of FIG. 9.

The actual surface location 42 is out of position opposite the nominal surface vector 10 which is shown in FIG. 10BC.

In this case, the approach scan path is altered by the CMM controller in such a way as to create a new approach path 43 which is on a parabolic curve that blends from approach angle to the nominal surface vector. The control servos move the CMM along the new approach path and continues until the actual part surface 42 is contacted. Once part contact is obtained, the CMM is servo controlled in the same manner as described in the description of FIG. 9.

Figure 11:
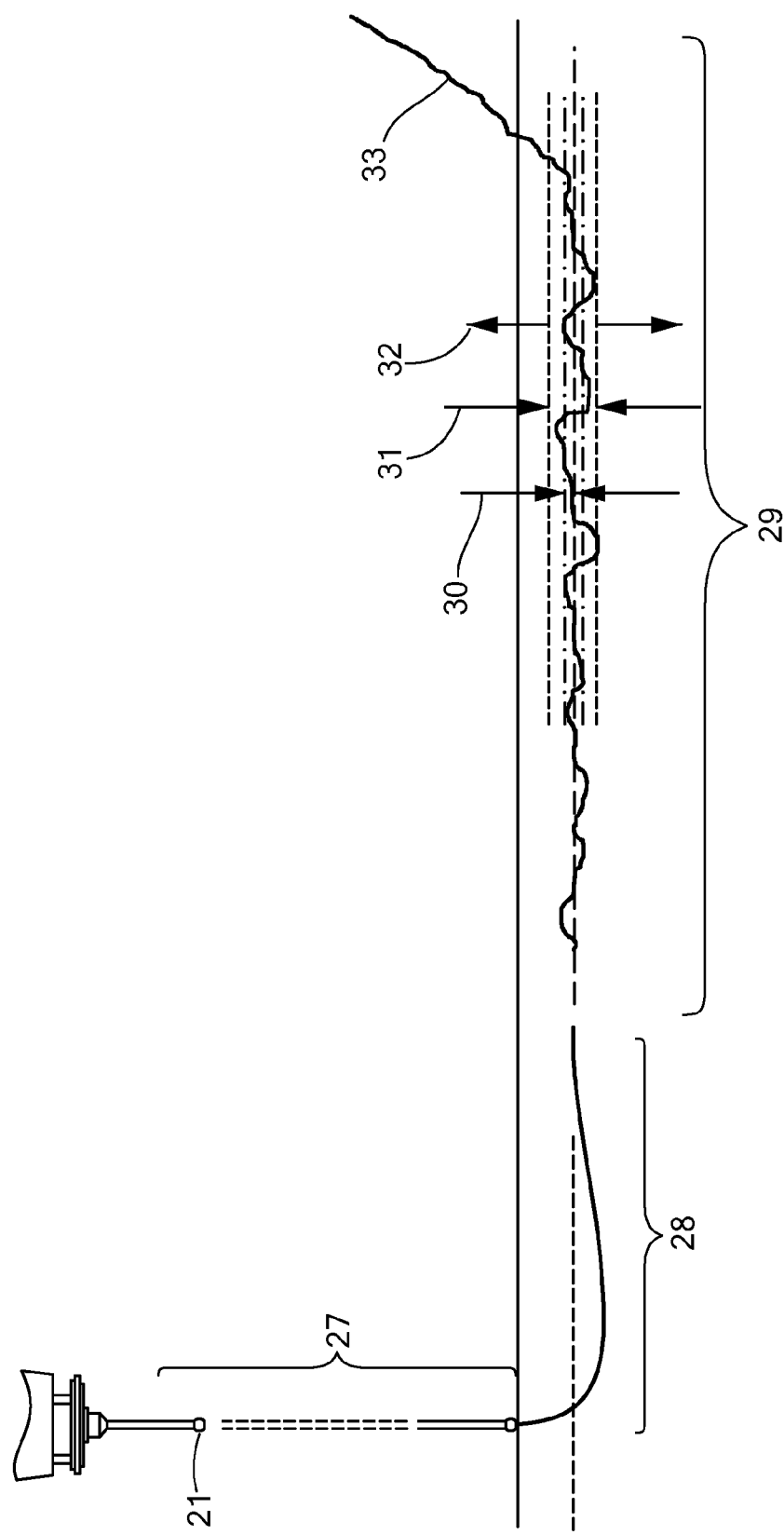
FIG. 11 shows an example for recording positional data for the probe pin together with data indicating the particular type of path.

FIG. 11 shows an example for recording positional data for the probe pin as a return point tagging together with data indicating the particular type of path.

When the scan data is returned from the CMM controller to the host software for analysis, certain tags can be set to allow the host to a) sectionalize the points into parts as to perform analysis on the intended defined scan path(s) without regard for the approach and settling path and b) allow for deviational analysis of each point as to its qualitative properties.

Both of these tags, point and quality, are defined with respect to FIG. 11. With each scan segment, a unique point tag number is assigned and sent to the controller from the host software. Starting from the pre-hit point 21, the first scan approach segment would, for example, be assigned a tag of "1" as indicated with reference sign 27, the settling segment would be assigned a tag of "2" as indicated with reference sign 28, the defined path scan segment would be assigned a tag of 3 as indicated with reference sign 29, and so on until all segments are assigned. From these returned tags, the host software can differentiate the scan segments and analyze just the segments of interest.

Once the desired scan segments have been parsed into individual segments, a quality tag can be used to further analyze each point. Using defined parameters, each point from the actual scan data set 33 would be given a quality tag dependent on how well the defined scan probe offset is adhered to. In this way, extraneous point(s) can be ignored when the scan segment is analyzed. For instance, if a scanned point falls within the 'good' tolerance zone 30, it would be given a quality tag of zero; points within the next tolerance zone 31 but beyond the first would be given a quality tag of five and if the point is beyond the last tolerance zone 32, it would be given a quality tag of nine. This assignment of quality tags can be defined indefinitely.

Figure 12:
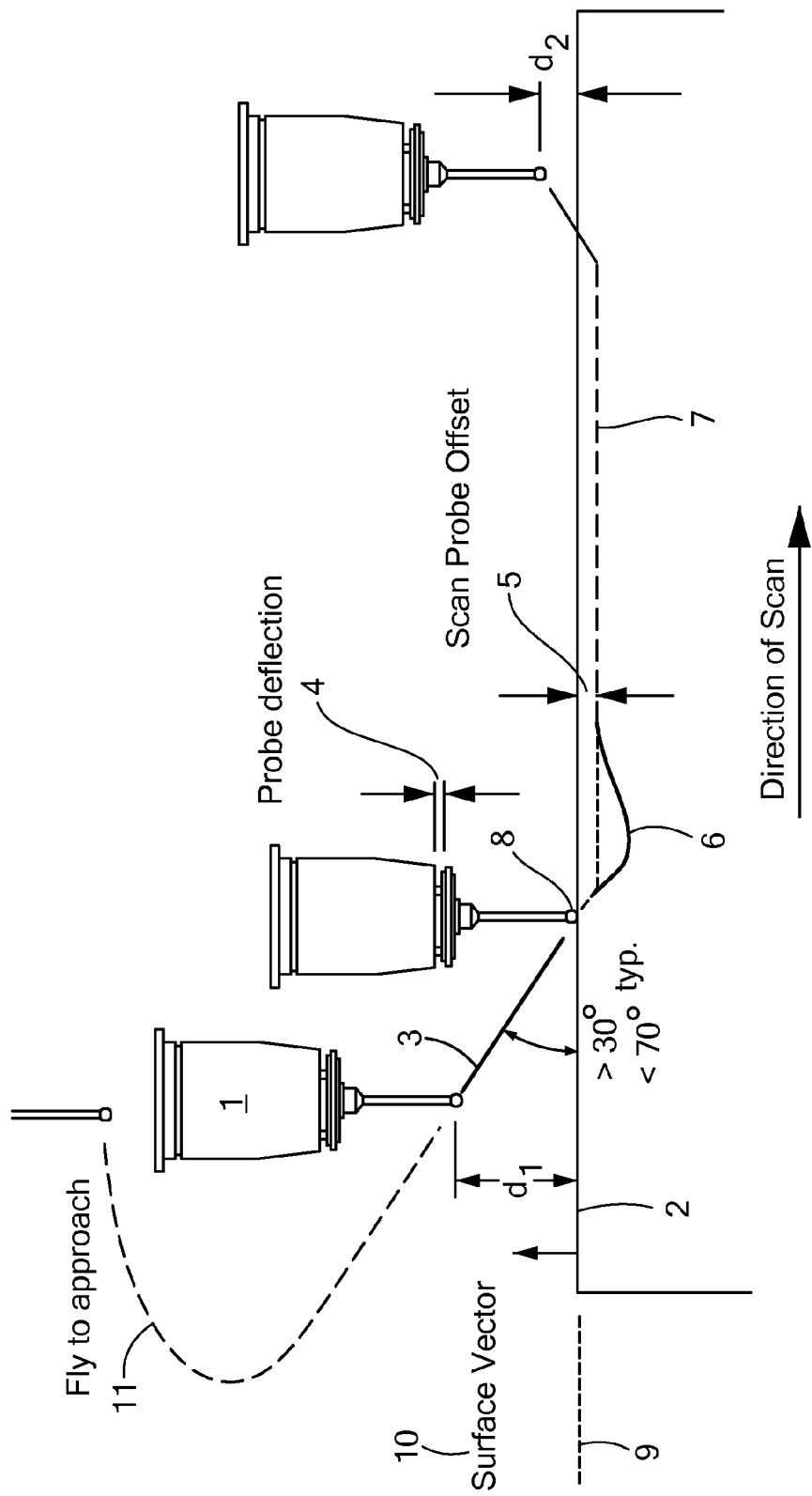
FIG. 12 shows the integration of all independent inventions into one combined method for controlling the surface scanning for a coordinate measuring machine and FIG. 13 shows examples of styli that can be used with the invention.

FIG. 12 shows the integration of all independent inventions into one combined method for controlling the surface scanning for a coordinate measuring machine with elimination of the pre-hit dwell.

With the implementation of the previous inventions as illustrated in FIGS. 9 to 11, it is possible to eliminate the dwell at the pre-hit point 21 as this no longer has an effect on the resultant settling before a defined scan. Before each defined path scan, the CMM moves at positional velocity between measurements in a path where there are no sharp corners to slow the motion the probe 1 to a point in space situated away from the part surface 2 opposite the scan direction, >30° and <80° from surface vector tangent 9 and at a specified offset $d_1$ from said surface to be measured. The blended approach path 3 has its vectors set to zero to nullify the effects of the observer function.

From this point in space, the CMM control servo system then directs the probe 1 to immediately scan along the pre-described blending approach path 3 at a pre-defined scan velocity until the probe pin 8 contacts the part surface as measured by the probe's deflection 4 via its sensors and continues until the defined scan probe offset 5 is reached. This is denoted as a dashed line for clarity but it is actually the probe deflection (probe deflection=scan probe offset.)

The pre-defined path is then automatically modified 6 whereby the control system alters the defined scan 7 path to obtain a) the defined scan offset and b) the best method to dampen any vibration of the probe and/or coordinate measuring machine. The defined scan path 7, with surface normal vectors 10, then ensues at said scan probe offset 5 and at a pre-defined scan velocity.

Figure 13:
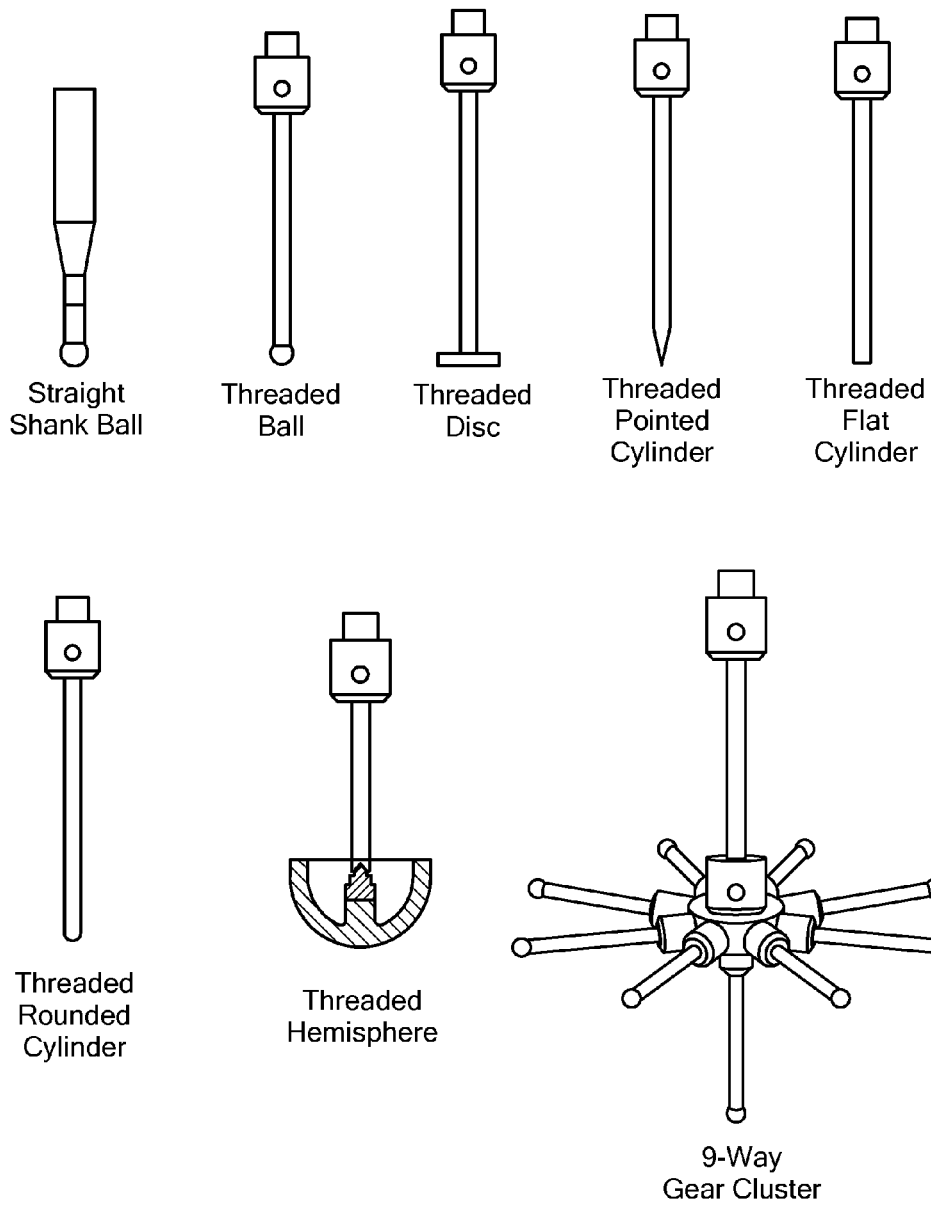

FIG. 13 shows examples of different embodiments of styli for probe heads that can be used with the invention.

The diagrams of the figures should not be considered as being drawn to scale.

What is claimed is:

1. A method of controlling a surface scanning measuring machine having a probe head with a distal probe tip, the distal probe tip being configured for contacting the surface of an object to be measured, the method comprising:
   selecting a nominal initial contact point on the surface, the nominal initial contact point having a normal vector; and
   moving the distal probe tip toward the nominal initial contact point along an approach path from a release path of a previous contact with the surface of the object, the approach path having a generally linear portion that generally linearly extends from the nominal initial contact point to a non-contacting point spaced from the surface between the release path and the approach path, the generally linear portion forming an angle with the normal vector of between about 20 degrees and about 60 degrees.

2. The method as defined by claim 1 further comprising:
   moving the distal probe tip along an offset path and to an initial scan point from a contact point related to the nominal initial contact point;
   moving the distal probe tip along a scan path from the initial scan point and along the surface of the object, the distal probe tip moving continually along and between the approach path, the offset path, and the scan path.

3. The method as defined by claim 1 wherein the generally linear portion forms an angle with the normal vector of between about 20 and about 55 degrees.

4. The method as defined by claim 1 further comprising:
   moving the distal probe tip along a release path where the tip moves away from contact with the surface of the object, the release path beginning after the scan path,
   the distal probe tip moving continually along and between the scan path and the release path.

5. The method as defined by claim 4 further comprising:
   selecting a second nominal initial contact point on the surface, the second nominal initial contact point having second normal vector; and
   after moving the distal probe tip from the release path, moving the distal probe tip into contact with the second nominal initial contact point along a second approach path, the second approach path having a second generally linear portion that generally linearly extends from the second nominal contact point to some second non-contacting point spaced from the surface, the second generally linear portion forming an angle with the second normal vector of between about 20 degrees and about 59 degrees.

6. The method as defined by claim 5 wherein the distal probe tip moves continually along and between the release path and the second approach path.

7. The method as defined by claim 1 further comprising:
moving the probe head downwardly and settling at an offset after moving the distal probe tip into contact with a contact point related to the nominal initial contact point, the probe head overshooting the offset before settling at the offset.

8. The method as defined by claim 1 further comprising:
moving the probe head downwardly and settling at an offset after moving the distal probe tip into contact with a contact point related to the nominal initial contact point, the probe head oscillating above and below the offset before settling at the offset.

9. A method of controlling a surface scanning measuring machine having a probe head with a distal probe tip, the distal probe tip being configured for contacting the surface of an object to be measured, the method comprising:
selecting a nominal initial contact point on the surface, the nominal initial contact point having a normal vector;
moving the distal probe tip toward the nominal initial contact point along an approach path from a release path of a previous contact with the surface of the object, the approach path having a generally linear portion that generally linearly extends from the nominal initial contact point to a non-contacting point spaced from the surface between the release path and the approach path, the generally linear portion forming an angle with the normal vector of less than about 60 degrees; and
moving the distal probe tip along an offset path to an initial scan point,
the distal probe tip moving continually along and between the approach path and the offset path.

10. The method as defined by claim 9 wherein the generally linear portion forms an angle with the normal vector of between about 0 and about 5 degrees.

11. The method as defined by claim 9 further comprising moving the distal probe tip into contact with an actual contact point on the surface, the actual contact point being related to the nominal initial contact point, the offset path beginning at the actual contact point.

12. The method as defined by claim 11 further comprising:
moving the probe tip through the nominal initial contact point without contacting the actual contact point; and
reducing the angle of the approach path relative to the normal vector after the probe tip passes through the nominal initial contact point and before the probe tip contacts the actual contact point.

13. The method as defined by claim 12 wherein the approach path has a logarithmic shape after the probe tip passes through the nominal initial contact point and before the probe tip contacts the actual contact point.

14. A surface scanning measuring machine for contacting the surface of an object to be measured, the surface scanning measuring machine comprising:
a probe head with a distal probe tip;
a controller operatively coupled with the probe head, the controller being configured to select a nominal initial contact point on the surface, the nominal initial contact point having a normal vector; and
a drive mechanism operatively coupled with the controller, the drive mechanism being configured to cooperate with the controller to move the distal probe tip toward the nominal initial contact point along an approach path from a release path of a previous contact with the surface of the object, the approach path having a generally linear portion that generally linearly extends from the nominal initial contact point to a non-contacting point spaced from the surface between the release path and the approach path, the generally linear portion forming an angle with the normal vector of between about 20 degrees and about 60 degrees.

15. The surface scanning machine as defined by claim 14 wherein the drive mechanism is configured to cooperate with the controller to move the distal probe tip from an actual contact point related to the nominal initial contact point along an offset path and to an initial scan point, the drive mechanism also being configured to cooperate with the controller to move the distal tip along a scan path from the initial scan point and along the surface of the object,
the distal probe tip moving continually along and between the approach path, the offset path, and the scan path.

16. The surface scanning machine as defined by claim 14 wherein the generally linear portion forms an angle with the normal vector of between about 20 and about 55 degrees.

17. The surface scanning machine as defined by claim 14 wherein the drive mechanism is configured to cooperate with the controller to move the distal probe tip along a release path where the tip moves away from contact with the surface of the object, the release path beginning after the scan path,
the distal probe tip moving continually along and between the scan path and the release path.

18. The surface scanning machine as defined by claim 17 wherein the drive mechanism is configured to cooperate with the controller to 1) select a second nominal initial contact point on the surface, the second nominal initial contact point having second normal vector, and 2) after moving the distal probe tip from the release path, move the distal probe tip into contact with the second contact point related to the second nominal initial contact point along a second approach path, the second approach path having a second generally linear portion that generally linearly extends from the second contact point to some second non-contacting point spaced from the surface, the second generally linear portion forming an angle with the second normal vector of equal to or greater than about 20 degrees and less than about 59 degrees.

19. The surface scanning machine as defined by claim 18 wherein the distal probe tip moves continually along and between the release path and the second approach path.

20. The surface scanning machine as defined by claim 14 wherein the drive mechanism is configured to cooperate with the controller to move the probe head downwardly and settle at an offset after moving the distal probe tip into contact with an actual contact point related to the nominal initial contact point, the probe head overshooting the offset before settling at the offset.

21. The surface scanning machine as defined by claim 14 wherein the drive mechanism is configured to cooperate with the controller to move the probe head downwardly and settle at an offset after moving the distal probe tip into contact with an actual contact point related to the nominal initial contact point, the probe head oscillating above and below the offset before settling at the offset.

22. A computer program product for use on a computer system for controlling a surface scanning measuring machine having a probe head with a distal probe tip, the distal probe tip being configured for contacting the surface of an object to be measured, the computer program product comprising a tangible computer usable medium having computer readable program code thereon, the computer readable program code comprising:

program code that selects a nominal initial contact point on the surface, the nominal initial contact point having a normal vector; and program code that moves the distal probe tip into contact with the nominal initial contact point along an approach path from a release path of a previous contact with the surface of the object, the approach path having a generally linear portion that generally linearly extends from the nominal initial contact point to a non-contacting point spaced from the surface between the release path and the approach path, the generally linear portion forming an angle with the normal vector of between about 20 degrees and about 60 degrees.

23. The computer program product as defined by claim 22 further comprising:

program code that moves the distal probe tip from an actual contact point related to the nominal initial contact point along an offset path and to an initial scan point;

program code that moves the distal tip along a scan path from the initial scan point and along the surface of the object, the distal probe tip moving continually along and between the approach path, the offset path, and the scan path.

24. The computer program product as defined by claim 22 wherein the generally linear portion forms an angle with the normal vector of between about 20 and about 55 degrees.

25. The computer program product as defined by claim 22 further comprising:

program code that moves the distal probe tip along a release path where the tip moves away from contact with the surface of the object, the release path beginning after the scan path, the distal probe tip moving continually along and between the scan path and the release path.

26. The computer program product as defined by claim 25 further comprising:

program code that selects a second nominal initial contact point on the surface, the second nominal initial contact point having second normal vector; and program code that moves the distal probe tip into contact with a second actual contact point along a second approach path after moving the distal probe tip from the release path, the second approach path having a second generally linear portion that generally linearly extends from the second actual contact point to some second non-contacting point spaced from the surface, the second generally linear portion forming an angle with the second normal vector of equal to or greater than about 20 degrees and less than about 59 degrees.

27. The computer program product as defined by claim 26 wherein program code that moves has program code that causes the distal probe tip to move continually along and between the release path and the second approach path.

28. The computer program product as defined by claim 22 further comprising:

program code that moves the probe head downwardly to settle at an offset after moving the distal probe tip into contact with an actual contact point related to the nominal initial contact point, the probe head overshooting the offset before settling at the offset.

29. The computer program product as defined by claim 22 further comprising:

program code that moves the probe head downwardly to settle at an offset after moving the distal probe tip into contact with an actual contact point related to the nominal initial contact point, the probe head oscillating above and below the offset before settling at the offset.

30. The method as defined by claim 1 further comprising:

moving the distal tip along a scan path along the surface of the object;

defining a plurality of zones that are spaced from the surface; and assigning a tag to a plurality of points of the object surface along the scan path, each tag being assigned as a function of the tag's point and the plurality of zones.

* * * * *